April 8, 1930.  H. A. McGOWAN  1,753,713

WINDSHIELD WIPER

Filed March 11, 1929

Harold A. McGowan, *Inventor*

By Herbert E. Smith, *Attorney*

Patented Apr. 8, 1930

1,753,713

UNITED STATES PATENT OFFICE

HAROLD A. McGOWAN, OF DAVENPORT, WASHINGTON

WINDSHIELD WIPER

Application filed March 11, 1929. Serial No. 345,999.

My present invention relates to an improved windshield wiper for use on the windshields of automotive vehicles, aircraft or water craft, and adapted to be operated in any suitable manner.

The wiper is of the pivoted type that swings or oscillates, on a pivotal point, across the area of the windshield that is to be wiped or cleansed of moisture, and in combination with the wiper I employ a heating element in an electric circuit for the purpose of melting snow, sleet, or ice that may accumulate on the windshield. The presence of the heating element in the wiper provides means whereby the snow, ice, or sleet may be melted to facilitate the wiping operations of the wiper, and the latter is thus enabled to keep clean the windshield to insure the necessary vision of the driver of an automobile through the windshield.

My invention consists in certain novel combinations and arrangements of parts involved in the construction of the heated wiper as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1:
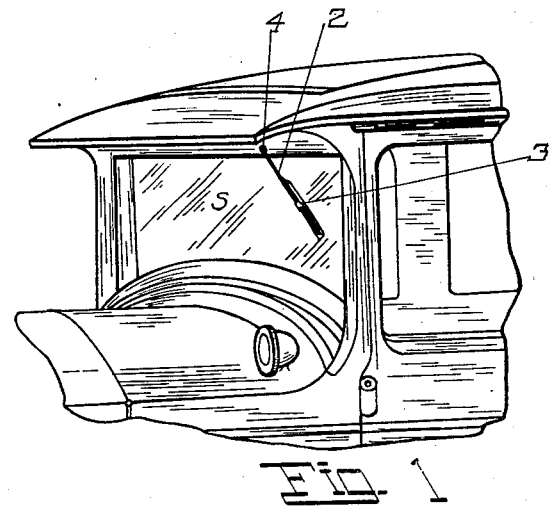
Figure 2:
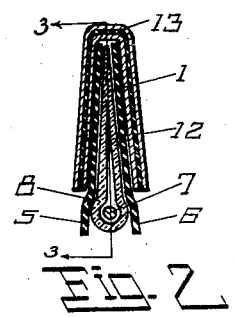
Figure 3:
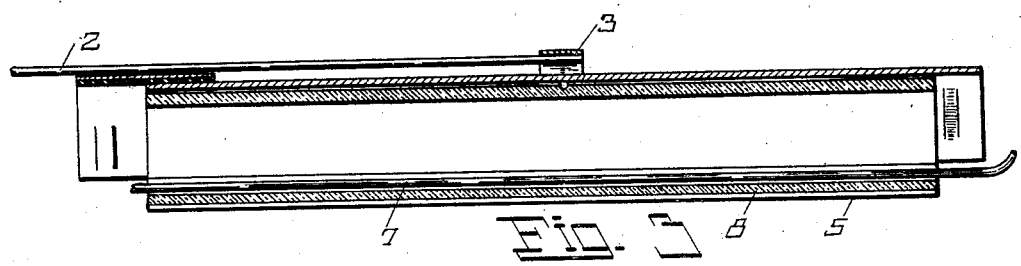
Figure 4:
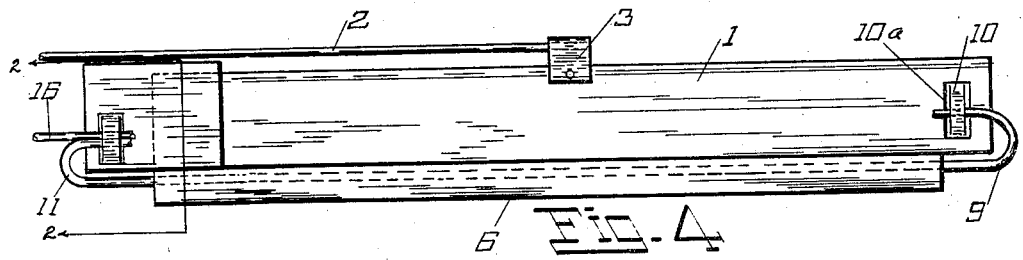
Figure 5:
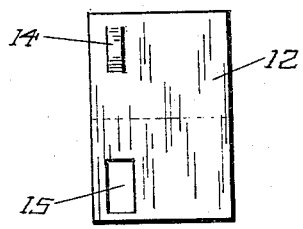

Figure 1 is a perspective view at the front of an automotive vehicle showing the windshield equipped with the wiper of my invention. Figure 2 is an enlarged transverse vertical sectional view of the wiper at line 2—2 of Figure 4. Figure 3 is a longitudinal sectional view at line 3—3 of Figure 2. Figure 4 is a side view of the wiper, and Figure 5 is a detail view of one of the fastening clips.

In order that the general arrangement of parts may readily be understood and the utility of the device be illustrated I have shown in Figure 1 a portion of the front of an automobile with the usual windshield S, and the wiper of my invention includes a holder 1 of metal in U-shape or V-shape, to which is attached the swing or operating arm 2. The arm is secured at 3 to the holder, and is also pivoted at 4 to a suitable part of the windshield frame to permit the wiper to swing or oscillate on the pivot, under either manual, or power operation.

Within the holder the wiper is retained and has a pair of wiping sheets 5 and 6, the outer free edges of which are designed to wipe across the windshield in usual manner. These wipers or wiping sheets are of rubber, or other suitable material, and their free edges project beyond the edges of the U-shape holder so that the wipers are free to operate across the face of the windshield in the performance of their functions.

Between the wiping edges of the wiper a wire conductor 7 is encased in a casing 8 of asbestos or other suitable material, and this casing or tubular cover for the conductor forming the electric heating element, is clamped and thus retained between the spaced parts of the holder, sufficiently close to the wiping edges and to the windshield, as to provide the necessary heat for melting the ice, snow, or sleet that is to be wiped by the wiping edges of the device.

At one end, the heating element is bent as at 9, and this end of the heating element is retained by the two parts of the holder through the use of an integral loop strap 10 at one side of the holder that is forced through a slot 10ª at the other side of the holder. The loop strap projects through the slot so that the bent end may be slipped through the strap, and then the resiliency of the metal holder draws on the strap to hold the bend or bent end frictionally between the strap and the face of the holder.

The loop strap is struck or stamped from the material of the holder, and in addition to co-acting with the slotted side of the holder, these parts provide a ground for the electrical currents of the heating circuit that passes through the heating element.

At the other end of the holder, the end of the heating element is bent as at 11, and this end or bend, like the bend 9 projects beyond the end of the holder, is secured to the holder, but is insulated therefrom. An extension clip 12, of U-shape is secured to the holder and provided with an intervening lining 13 of insulated material so that the clip is insulated from the holder. The metal clip is formed from a blank, as illustrated in Figure 5, and bent on the dotted line so that it will fit over and conform to the shape of the holder. The clip is fashioned with an integral loop strap 14 stamped or pressed therefrom, and with a complementary slot 15, the strap and the slot registering when the clip is bent or folded to its U-shape or V-shape form to straddle the holder.

The end 11 of the heating element is retained by the strap, which projects through the opposed slot, and the end of the element is slipped through the strap so that the element is frictionally held between the strap and the opposite face of the holder. In Figure 4 an end of a wire 16 is also shown as retained by the strap, said wire being a part of the wiring for the electric circuit for the heating element, and the wire may be welded or otherwise made fast to the heating element.

In this manner the parts of the heating-wiper are readily assembled, and the strap and slot connection for the holder and heating element at the ends of the latter, due to the resiliency of the holder, retain the parts in assembled position against accidental displacement.

Having thus fully described my invention, what I claim as new and desire to secure by Letters Patent is:—

The combination in a windshield wiper with a U-shaped holder and spaced wiping sheets therein having free working edges, of a casing between the sheets and an electric heating element in the casing, said element having bent ends projecting beyond the casing, a loop strap on one side of the holder adjacent each end and a complementary slot for each strap at the other side of the holder for receiving the bent ends as described, and one end of the element being grounded while the other end is insulated from the holder.

In testimony whereof I affix my signature.

HAROLD A. McGOWAN.